Feb. 16, 1954 G. SHAPIRO 2,669,699

MULTIPOINT TEMPERATURE COMPENSATION FOR TUNERS

Filed Oct. 30, 1951 2 Sheets-Sheet 1

Inventor
GUSTAVE SHAPIRO

By Walter S. Paul. Attorney

Inventor
GUSTAVE SHAPIRO

By Walter S. Paul
Attorney

Patented Feb. 16, 1954 2,669,699

UNITED STATES PATENT OFFICE 2,669,699

MULTIPOINT TEMPERATURE COMPENSATION FOR TUNERS

Gustave Shapiro, Washington, D. C., assignor to the United States of America as represented by the Secretary of the Navy Application October 30, 1951, Serial No. 253,947

9 Claims. (Cl. 336—30)

(Granted under Title 35, U. S. Code (1952), sec. 266)

This invention relates to permeability tuning apparatus and more particularly to permeability tuning apparatus arranged to provide temperature compensation over its entire range of operation.

The need for a practical means of providing temperature compensation for permeability tuning apparatus has long been recognized. However, this problem has been very difficult to solve, because a different temperature compensation is required for each setting of the tuning apparatus. Consequently, any efforts in this direction must necessarily be hampered by the prospect of encumbering a tuner with relatively complicated and bulky mechanisms in order to provide satisfactory temperature compensation over the entire range of operation. However, the device described below constitutes a relatively simple and compact improvement for the particular class of permeability tuner disclosed in U. S. Patent No. 2,586,870, February 26, 1952, which provides an effective means of temperature compensation over the entire range of operation.

In the copending application referred to above, the tuner assembly comprises one or more slugs moved in and out of corresponding inductors. The slugs are moved by a member driven along a shaft by means of a spiral screw whenever the shaft is rotated. The movement of this member is transmitted to the slug through a linkage biased into continuous engagement with an adjustable cam surface. The linkage is deflected by the cam surface so that the rate of movement of the slug depends in part upon the shape of the cam surface. The shape of the cam is determined by a series of set screws extending through a frame member and into engagement with the cam. By proper adjustment of these set screws the cam surface may be made to assume a shape which will compensate for and thus diminish or eliminate undesirable tuning variations.

The instant invention adds to the features of the tuner assembly described above a bimetallic plate having a series of parallel fingers each of which is arranged to support one of the set screws described above. This bimetallic plate is mounted upon the frame of the tuner assembly between a pair of identical restraining templates shaped to immobilize a portion of each finger so that the flexure of each finger produces a deflection of the adjacent portion of the cam surface which will result in the desired temperature compensation for the setting of the tuner affected by that portion of the cam.

The object of the present invention is to provide for temperature compensation of a permeability tuner over its entire range of operation.

Another object is to provide a plurality of independent automatic temperature compensating means so that different temperature compensations may be introduced at various settings of a permeability tuner.

Still another object is to provide a simple means of introducing a satisfactory temperature compensation in a permeability tuner suitable for production in large quantities yet readily adjustable to meet relatively strict standards of performance.

Figure 4:
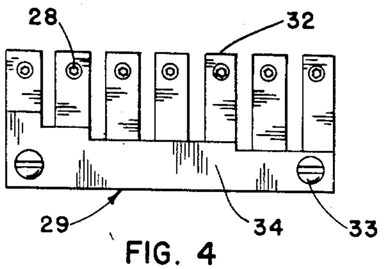
Fig. 4 is a plan view of the temperature responsive bimetallic plate with separate fingers for the support of individual set screws.
Figure 5:
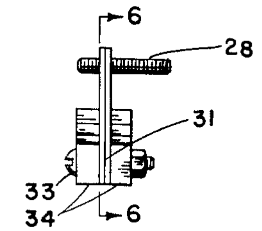
Fig. 5 is an end view of the assembly shown in Fig. 4.
Figure 6:
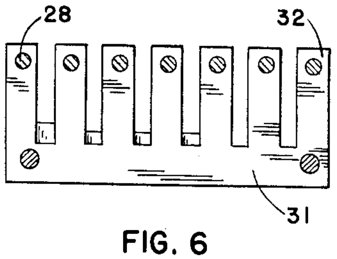
Fig. 6 is a section taken on line 6—6 of Fig. 5 showing the bimetallic plate with the top restraining template cut away.
Figure 7:
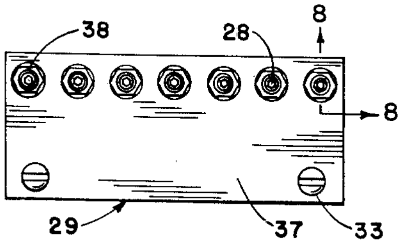
Figure 8:
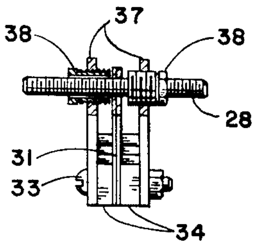

Figs. 7 and 8 show a plan view and an end view, respectively, of a modification of the assembly shown in Figs. 4, 5, and 6, and Fig. 9 is a chart showing simplified representations of the tuning error due to temperature variations without any temperature compensating means, with the temperature compensating means shown in Figs. 4, 5, and 6, and with the temperature compensating means shown in Figs. 7 and 8.

Figure 1:
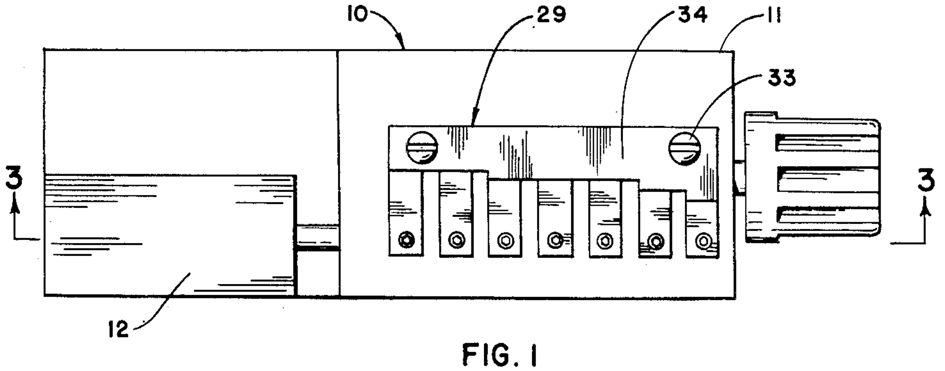
Fig. 1 is a plan view of a permeability tuner embodying the improvements described herein.

Referring now to the drawings, in which like reference numerals are used to designate like parts, and first to Fig. 1 in particular, Fig. 1 shows the general arrangement of a permeability tuning device embodying the present invention.

Figure 2:
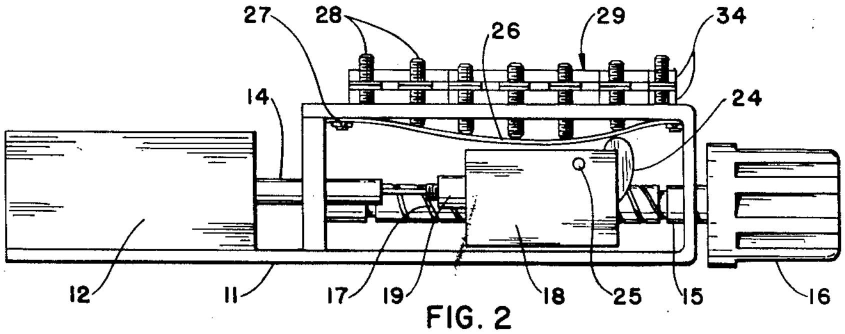
Fig. 2 is a side elevation of the tuner shown in Fig. 1.
Figure 3:
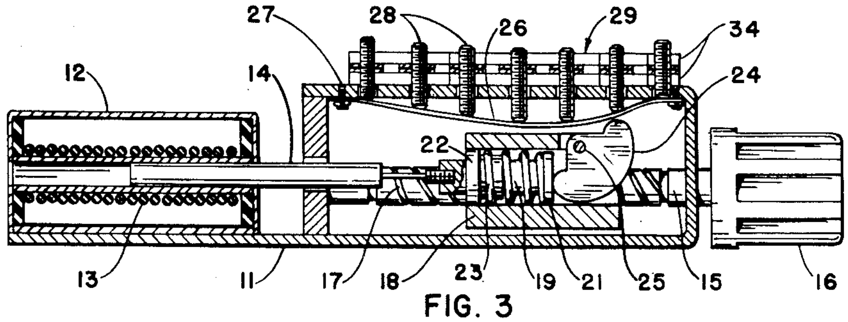
Fig. 3 is a vertical section taken on line 3—3 of Fig. 1 showing details of the cam surface and the set screws by means of which the cam surface is arranged to compensate for undesirable frequency variations in the tuner, and also details of the slug driving mechanism.

In Figs. 2 and 3, this device is shown in more detail. Frame 11 supports a housing 12 at one end. This housing 12 contains an inductor 13. A tuning slug 14 is supported in frame 11 for movement into and out of inductor 13. A shaft 15 is rotatably mounted in the frame 11 parallel to slug 14. A knob 16 is mounted on one end of shaft 15 so that the shaft may be rotated manually. A screw thread 17 is cut in the surface of the shaft 15 and a sliding block 18 slidable along the shaft within the frame 11 has a projection (not shown) which engages the screw thread 17 so that rotation of the shaft produces sliding movement of the block 18. A plunger 19 is slidably mounted in a passageway within sliding block 18 for movement relative to the block in the direction in which the block slides. This plunger 19 has a collar 21 around its inner end and the other end of the plunger 19 extends through an annular ring 22 fixedly mounted in the block 18 at the outer end of the passageway therein. A plunger biasing spring 23 extending spirally about the plunger 19 bears against the plunger collar 21 at one end and against the annular ring 22 at the other end so that it continuously biases the plunger in one direction. Consequently, the plunger 19 is maintained in contact with the cam follower 24 which is pivotally supported in sliding block 18 upon pivot 25. This cam follower 24 is in turn maintained in contact with an adjustable cam surface held in place in frame 11 by cam supporting means 27 and adjusted as to its shape by a plurality of set screws 28 mounted in a set screw supporting assembly 29 located upon the frame 11 in the position shown in Figs. 1, 2 and 3.

The set screw supporting means 29 in which the set screws are mounted is shown in more detail in Figs. 4, 5 and 6. Accordingly, this portion of the device will be described with reference to these figures. The set screw supporting means 29 includes a bimetallic plate 31 having a series of integral fingers 32 extending parallelly from one side thereof. Each of these fingers 32 supports one set screw 28. The bimetallic plate 31 is secured to the frame 11 by means of mounting screws 33. The amount which the various fingers 32 must deflect in order to produce the desired temperature compensation at the corresponding points on the cam surface generally is different for each finger. An expedient means for making the necessary adjustment of the deflection of each finger is provided by making the dimensions of all the fingers identical and then immobilizing a portion of the length of each finger 32 by means of a pair of restraining templates 34 cut in identical steps along the series of fingers so that only the desired length of each finger is permitted to deflect in response to temperature changes. These restraining templates 34 are clamped in place on opposite sides of the bimetallic plate 31 by some suitable means such as the mounting screws 33.

Figs. 7 and 8 show a modification of the means of mounting the set screws for movement in response to temperature changes, so that a different type of temperature compensation results. In this modification, there are a pair of stop supporting plates 37, one of which is clamped over each of the restraining templates 34. Each stop supporting plate 37 supports a series of stops through which the respective set screws 28 pass slidably and concentrically. Each stop is adjustable to limit the deflection of one finger 32 in one direction, and the pair of stops which engage the opposite sides of each finger are together effective to limit the movement of this finger in both directions.

An additional variation of the present invention can be produced in which the elements of the set screw supporting assembly 29 as shown in Figs. 4, 5, and 6 are arranged in combination with frame 11 so that the frame 11 is effective as a stop to limit the deflection of the set screw supporting fingers 32 in one direction. Thus, by selecting a restraining template 34 of the proper thickness for use between the bimetallic plate 31 and the frame 11, the frame is made the equivalent of one of the stop supporting plates 37 and the stops 38 supported thereby which are included in the set screw supporting assembly shown in Figs. 7 and 8.

Figure 9:
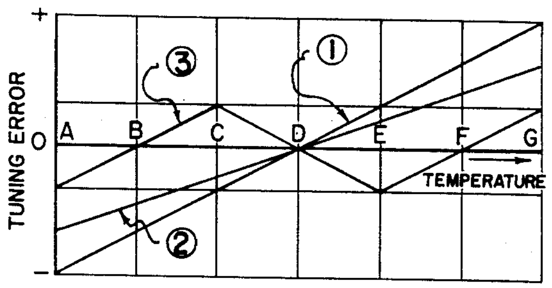

Fig. 9 is a chart including three curves constituting simplified approximate representations of the tuning error due to temperature variations under three different operating conditions. The primary purpose of this chart is to provide a comparison of the variation in the tuning error for a particular frequency setting over the range of temperature variation; first, without any temperature compensation; then, with the temperature compensating device shown in detail in Figs. 4, 5, and 6; and finally, with the temperature compensating device shown in Figs. 7 and 8. On the chart, 1 designates a simplified representation of a tuning error curve for a permeability tuner without any temperature compensation, in which there is zero error at point D midway of the anticipated temperature range, and a gradually increasing positive error as the temperature changes toward one extreme and a gradually increasing negative error as the temperature changes toward the other extreme.

In operation the modification of the device as shown in Figs. 4, 5, and 6 provides a series of supports for the series of set screws each of which deflects in response to temperature changes over the entire range of temperature variation so that the shape of the cam surface is changed in a manner which will at least partially compensate for the change in temperature and thus reduce the maximum tuning error as shown by the curve designated by 2 on the chart.

The operation of the modification of the device shown in Figs. 7 and 8 differs to the extent that the finger supporting each set screw is only free to deflect in response to temperature changes over an intermediate portion of the temperature range. For example, with respect to Fig. 9, each finger remains against one stop while the temperature varies between points A and C. In this connection, it would be desirable to adjust the tuner so that the tuning error would be zero at point B located between points A and C. At point C the finger begins to deflect in response to temperature changes and continues to do so until the temperature reaches the point E where the finger engages the other stop. The deflection of the finger is adjusted so that it over compensates and consequently, the tuning error also becomes zero at a point D located between points C and E. In the temperature range between points E and G the temperature compensating device is again inoperative because the finger remains against a stop. Once again the error varies in the same general manner as between points A and C. However, since the error was over compensated between points C and E the error will also be zero at a point F between points E and G. Thus, although this modification provides temperature compensation over an intermediate temperature range only, the magnitude of the tuning error due to temperature variations is always small.

Clearly, the device described herein is operative in the manner described to compensate for errors in a permeability tuner due to temperature changes. However, while the simplified representation of various tuning error curves in Fig. 9 may seem to suggest that an absolute temperature compensation over the entire temperature range is possible, such a conclusion is not intended. The tuning error curves represented as linear in Fig. 9 to simplify the disclosure are actually more complex. For example, the use of linear curves in Fig. 9 assumes a constant temperature coefficient although it is never absolutely constant in practice. On the other hand, in practical applications, the device described herein is capable of considerably reducing the maximum tuning error due to temperature variations.

Obviously, other modifications of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. For use with a permeability tuner having a series of independently adjustable regulating means for varying the rate of relative movement of the tuning slug and the inductor, a temperature responsive member including separate means supporting each regulating means, a deformable member to be shaped operatively contacted by said regulating means, and restraining means for each said supporting means to limit its response to a given temperature change to the desired amount.

2. For use with a permeability tuner having a series of independently adjustable regulating means for varying the rate of relative movement of the tuning slug and the inductor, a flat plate including a series of projections independently deflectable in response to changes in temperature, each said projection comprising the supporting means for one regulating means, a deformable member to be shaped operatively contacted by said regulating means, and a rigid member bearing against a portion of each said projection to limit the deflection of said projection to the desired amount.

3. For use with a permeability tuner having a series of independently adjustable regulating means for varying the rate of relative movement of the tuning slug and the inductor, a bimetallic plate mounted on the tuner and having a series of fingers each independently deflectable in response to temperature changes and arranged to support one regulating means, a deformable member to be shaped operatively contacted by said regulating means, and a pair of restraining templates bearing on opposite sides of said bimetallic plate and covering varying portions of the different fingers in order to control the amount of deflection of each finger.

4. For use with a permeability tuner having a drive mechanism, a temperature compensating means including a bimetallic plate having a series of fingers which deflect in response to temperature changes, a plurality of set screws each of said fingers supporting one set screw, and an adjustable cam surface operatively contacted by said set screws whereby the shape of the cam surface is automatically adjusted by deflection of the set screw supporting fingers to compensate for temperature variations.

5. For use with a permeability tuner having a drive mechanism, a temperature compensating means including a bimetallic plate having a series of fingers which deflect in response to temperature changes, a plurality of set screws, each of said fingers supporting one set screw, an adjustable cam surface operatively contacted by said set screws, and a stop member spaced from and located substantially parallel to said fingers, whereby the shape of the cam surface is automatically adjusted to compensate for temperature variations by deflection of the respective fingers over a range limited by the stop member.

6. For use with a permeability tuner having a drive mechanism, a temperature compensating means including a bimetallic plate having a series of fingers which deflect in response to temperature changes, a series of set screws, each of said fingers supporting one set screw, an adjustable cam surface operatively contacted by said screws, a stop supporting member spaced from and located substantially parallel to said fingers, and a series of adjustable stops mounted in said stop supporting member adjacent to the respective fingers, whereby the shape of the cam surface is automatically adjusted to compensate for temperature variations by deflection of the respective fingers over a range limited by the respective stops.

7. For use with a permeability tuner having a drive mechanism, a temperature compensating means including a bimetallic plate having a series of fingers which deflect in response to temperature changes, a plurality of sets screws, each of said fingers being arranged to support and containing one set screw, an adjustable cam surface operatively contacted by said set screws, a pair of stop supporting members spaced from the opposite sides of said bimetallic plate and extending substantially parallel to said fingers, and a series of adjustable stops mounted in each stop supporting member adjacent to the respective fingers, whereby the shape of the cam surface is automatically adjusted to compensate for temperature variations by deflection of the respective fingers over a range limited in each direction by the respective stops on one stop supporting member or the other.

8. In a cam adjuster having a series of independently adjustable regulating means for holding a selected shape to an adjustable cam the improvement comprising a bimetallic plate having a plurality of fingers, each finger being deflectable in response to temperature changes, a series of independently adjustable regulating means carried by said deflectable fingers, and a deformable cam forming member operatively contacted by said series of regulating means.

9. The device of claim 8 and; means operatively connected with said fingers for constraining the extent of deflection of each finger.

GUSTAVE SHAPIRO.

References Cited in the file of this patent

UNITED STATES PATENTS

| Number | Name | Date |
|---|---|---|
| 2,437,345 | Bell | Mar. 9, 1948 |
| 2,439,809 | Hunter | Apr. 20, 1948 |